United States Patent
Cheng et al.

(10) Patent No.: US 9,887,892 B2
(45) Date of Patent: Feb. 6, 2018

(54) TRAFFIC STATISTICS COLLECTION METHOD AND DEVICE

(71) Applicant: ZTE Corporation, Shenzhen (CN)

(72) Inventors: Yinkui Cheng, Shenzhen (CN); Yong Qian, Shenzhen (CN)

(73) Assignee: XI'AN ZHONGXING NEW SOFTWARE CO. LTD., Xi'An (CN)

(*) Notice: Subject to any disclaimer, the term of this patent is extended or adjusted under 35 U.S.C. 154(b) by 86 days.

(21) Appl. No.: 14/899,681

(22) PCT Filed: Apr. 25, 2014

(86) PCT No.: PCT/CN2014/076248
§ 371 (c)(1),
(2) Date: Dec. 18, 2015

(87) PCT Pub. No.: WO2014/201906
PCT Pub. Date: Dec. 24, 2014

(65) Prior Publication Data
US 2016/0134496 A1    May 12, 2016

(30) Foreign Application Priority Data

Jun. 20, 2013 (CN) .......................... 2013 1 0247017

(51) Int. Cl.
*G06F 15/16* (2006.01)
*H04L 12/26* (2006.01)

(52) U.S. Cl.
CPC ............ *H04L 43/062* (2013.01); *H04L 43/08* (2013.01); *H04L 43/0894* (2013.01)

(58) Field of Classification Search
CPC ................................ H04L 29/06; H04L 43/62
(Continued)

(56) References Cited

U.S. PATENT DOCUMENTS 8,321,653 B2*  11/2012  McNutt ................ G05B 19/054
                                                                    370/389
8,417,847 B2*   4/2013  McNutt ................ G05B 19/054
                                                                    370/352
(Continued)

FOREIGN PATENT DOCUMENTS

CN         1479495 A     3/2004
CN       101488835 A     7/2009
(Continued)

OTHER PUBLICATIONS

International Search Report for corresponding application PCT/CN2014/076248 filed Apr. 25, 2014; dated Jul. 16, 2014.
Supplementary European Search Report Application No. EP14814526; dated Mar. 2, 2016; pp. 6.

*Primary Examiner* — Khanh Dinh
(74) *Attorney, Agent, or Firm* — Cantor Colburn LLP

(57) ABSTRACT

Provided by the present disclosure are a traffic statistics collection method and device. In the method, one and the same counter is adopted to set an input control parameter for each type of message in N types of messages respectively; N count values are acquired from the counter when a first preset moment is reached, wherein the N count values include: a total number count of the N types of messages and N−1 input control parameter counts, which are received by a preset port at the first preset moment; and statistics are collected for traffic, at the first preset moment, of the each type of message in the N types of messages through the N input control parameters and the N count values respectively, thereby saving counter resources.

8 Claims, 4 Drawing Sheets

(58) Field of Classification Search
USPC .................................. 709/203, 220, 224, 228
See application file for complete search history.

(56) References Cited

U.S. PATENT DOCUMENTS

| | | | |
|---|---|---|---|
| 9,094,311 B2* | 7/2015 | Raleigh | H04L 41/0893 |
| 9,106,353 B2* | 8/2015 | Hsueh | H04L 63/0428 |
| 9,143,976 B2* | 9/2015 | Raleigh | H04L 41/0893 |
| 9,179,359 B2* | 11/2015 | Raleigh | H04L 41/0893 |
| 9,271,184 B2* | 2/2016 | Raleigh | H04L 41/0893 |
| 9,319,913 B2* | 4/2016 | Raleigh | H04L 41/0893 |
| 2002/0108059 A1 | 8/2002 | Canion et al. | |
| 2004/0210348 A1 | 10/2004 | Imhof et al. | |
| 2006/0059238 A1* | 3/2006 | Slater | G06Q 10/107 709/206 |
| 2006/0146999 A1 | 7/2006 | Thompson et al. | |
| 2007/0086352 A1 | 4/2007 | Tuffin et al. | |
| 2007/0100967 A1* | 5/2007 | Smith | G06F 8/20 709/219 |
| 2008/0091932 A1* | 4/2008 | McNutt | G05B 19/054 713/1 |
| 2015/0207208 A1* | 7/2015 | Liu | H01Q 1/243 343/702 |

FOREIGN PATENT DOCUMENTS

| | | |
|---|---|---|
| CN | 101626323 A | 1/2010 |
| CN | 101820394 A | 9/2010 |
| CN | 103001828 A | 3/2013 |

* cited by examiner

TRAFFIC STATISTICS COLLECTION METHOD AND DEVICE

TECHNICAL FIELD

The present disclosure relates to the field of communications, and in particular to a traffics statistics collection method and device.

BACKGROUND

Along with rapid development of Internet and computer technologies, mankind enters an informationized society. Due to rapid development of a network and wide popularization of related network applications, the Internet has gradually become an indispensable part in people's daily work and life. However, along with sharp increased page view and data traffic of an existing network, a processing capability and calculation intensity of the existing network are also correspondingly increased, thus real-time monitoring and traffic statistics collection of a network become more and more important.

There are three main implementation manners for traffic statistics collection in related art. The first is implementation through a proxy server, the second is implementation through a local router and the third is implementation through a self-control network bridge. However, irrespective of the implementation manner adopted, a counter technology is adopted. Thus it can be seen that the amount of counter resources is a key factor which limits the traffic statistics collection. A mainstream implementation manner adopting the counter technology in the related art is to simultaneously collect statistics on both the number of messages and the number of bytes in each message. In such a kind of implementation manner, one counter may usually collect the traffic statistics for only one type of data traffic. In case of counter resource shortage, counter resources would become a vital factor which limits traffic statistics collection. In case of a special condition, for example, when two types of data traffic are required to be simultaneously read for realization of certain specific functions, because there is inevitably a time difference during simultaneous operation of two counters, it is difficult to ensure counting accuracy.

SUMMARY

The embodiments of the present disclosure provide a traffic statistics collection method and device, so as to at least solve the problem that the same counter may collect statistics for traffic of only one type of messages in the related art.

According to one embodiment of the present disclosure, a traffic statistics collection method is provided.

The traffic statistics collection method according to the present disclosure includes: adopting one and the same counter to set an input control parameter for each type of message in N types of messages respectively, wherein N is a positive integer more than or equal to 2, each input control parameter is a positive integer, and N input control parameters set for the N types of messages are different from one another; acquiring N count values from the counter when a first preset moment is reached, wherein the N count values include: a total number count of the N types of messages and N−1 input control parameter counts, which are received by a preset port at the first preset moment, each input control parameter count is linearly related to the input control parameters of N−1 types of messages selected from the N types of messages, and the N−1 types of the messages corresponding to different input control parameter counts are partially the same; and collecting statistics for traffic, at the first preset moment, of the each type of message in the N types of messages through the N input control parameters and the N count values respectively.

In an example embodiment, before adopting the same counter to set the input control parameters for the each type of message respectively, the method further includes: extracting forwarding information of the each type of message in M types of messages respectively, wherein M is a positive integer, and M is more than or equal to N; and determining the N types of messages in the M types of messages according to the forwarding information.

In an example embodiment, extracting the forwarding information of the each type of message in the M types of messages respectively includes: acquiring characteristic information of the each type of message in the M types of messages respectively, and analyzing the characteristic information; and extracting the forwarding information from the analyzed characteristic information.

In an example embodiment, after determining the N types of messages in the M types of messages according to the forwarding information, the method further includes: dividing the counter into N bit fields according to the total number of the N types of messages and the N input control parameters, wherein each bit field in the N bit fields is in one-to-one correspondence with a total number count of the N types of messages and each count in the N−1 input control parameter counts respectively.

In an example embodiment, after determining the N types of messages in the M types of messages according to the forwarding information, the method further includes: acquiring N count values again from the counter when a second preset moment is reached; collecting statistics again for traffic, at the second preset moment, of the each type of message in the N types of messages respectively through the N count values acquired at the second preset moment and the N input control parameters; and calculating traffic of the each type of message in the N types of messages in a preset time period by adopting the traffic, at the first preset moment, of the each type of message in the N types of messages and the traffic, at the second preset moment, of the each type of message in the N types of messages, wherein the preset time period is a time period from the first preset moment to the second preset moment.

In an example embodiment, after collecting statistics for the traffic, at the first preset moment, of the each type of message in the N types of messages through the N input control parameters and the N count values respectively, the method further includes: forwarding the each type of message according to characteristic information of the each type of message in the N types of messages respectively.

According to the other embodiment of the present disclosure, a traffic statistics collection device is provided.

The traffic statistics collection device according to the present disclosure includes: a setting component, configured to adopt one and the same counter to set an input control parameter for each type of message in N types of messages respectively, wherein N is a positive integer more than or equal to 2, each input control parameter is a positive integer, and N input control parameters set for the N types of messages are different from one another; a first acquisition component, configured to acquire N count values from the counter when a first preset moment is reached, wherein the N counter values include: a total number count of the N types of messages and N-1 input control parameter counts, which are received by a preset port at the first preset moment, each input control parameter count is linearly related to the input control parameters of N-1 types of messages selected from the N types of messages, and the N-1 types of the messages corresponding to different input control parameter counts are partially the same; and a first statistics collection component, configured to collect statistics for traffic, at the first preset moment, of the each type of message in the N types of messages through the N input control parameters and the N count values respectively.

In an example embodiment, the device further includes: an extraction component, configured to extract forwarding information of the each type of message in M types of messages respectively, wherein M is a positive integer, and M is more than or equal to N; and a determination component, configured to determine the N types of messages in the M types of messages according to the forwarding information.

In an example embodiment, the extraction component includes: an acquisition element, configured to acquire characteristic information of the each type of message in the M types of messages respectively, and analyze the characteristic information; and an extraction element, configured to extract the forwarding information from the analyzed characteristic information.

In an example embodiment, the device further includes: a division component, configured to divide the counter into N bit fields according to the total number of the N types of messages and the N input control parameters, wherein each bit field in the N bit fields is in one-to-one correspondence with a total number count of the N types of messages and each count in the N-1 input control parameter counts respectively.

In an example embodiment, the device further includes: a second acquisition component, configured to acquire N count values again from the counter when a second preset moment is reached; a second statistics collection component, configured to collect statistics again for traffic, at the second preset moment, of the each type of message in the N types of messages respectively through the N count values acquired at the second preset moment and the N input control parameters; and a calculation component, configured to calculate traffic of the each type of message in the N types of messages in a preset time period by adopting the traffic, at the first preset moment, of the each type of message in the N types of messages and the traffic, at the second preset moment, of the each type of message in the N types of messages, wherein the preset time period is a time period from the first preset moment to the second preset moment.

In an example embodiment, the device further includes: a forwarding component, configured to forward the each type of message according to characteristic information of the each type of message in the N types of messages respectively.

According to the present disclosure, one and the same counter is adopted to set an input control parameter for each type of message in the N types of messages respectively, N is a positive integer more than or equal to 2, each input control parameter is a positive integer, and N input control parameters set for the N types of messages are different from one another; the N count values are acquired from the counter when the first preset moment is reached, the N count values include: a total number count of the N types of messages and N-1 input control parameter counts, which are received by the preset port at the first preset moment, each input control parameter count is linearly related to the input control parameters of the N-1 types of messages selected from the N types of messages, and the N-1 types of the messages corresponding to different input control parameters count are partially the same; and statistics are collected for the traffic, at the first preset moment, of the each type of message in the N types of messages through the N input control parameters and the N count values respectively. The problem that the same counter may collect statistics on the traffic of only one type of message in the related art is solved, thereby saving counter resources, ensuring accuracy of traffic statistics collection on multiple types of messages at the same moment, and improving flexibility and stability of a network.

BRIEF DESCRIPTION OF THE DRAWINGS

Drawings, provided for further understanding of the present disclosure and forming a part of the description, are used to explain the present disclosure together with embodiments of the present disclosure rather than to limit the present disclosure, wherein.

DETAILED DESCRIPTION OF THE EMBODIMENTS

The example embodiments are described in conjunction with the drawings as follows. It shall be understood that the example embodiments described herein are only used to describe and explain the present disclosure and shall not be construed as improper limitations on the same. The embodiments of the present application and the features of the embodiments can be combined with each other if there is no conflict.

Figure 1:
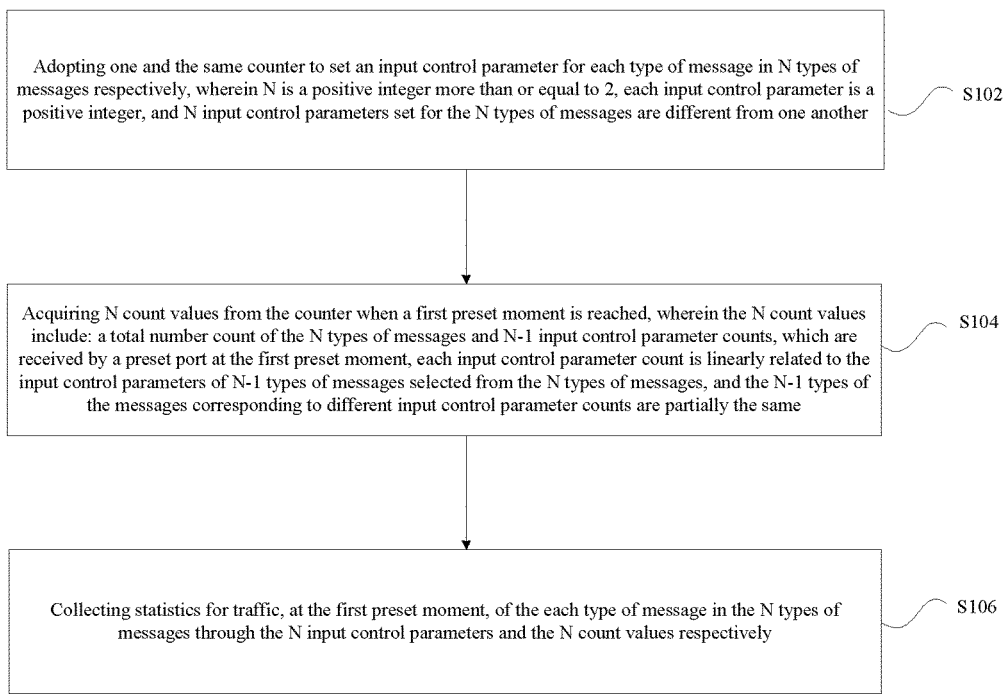
FIG. 1 is a flowchart of a traffic statistics collection method according to an embodiment of the present disclosure.

FIG. 1 is a flowchart of a traffic statistics collection method according to an embodiment of the present disclosure. As shown in FIG. 1, the method may include the following processing steps:

Step 102: adopting one and the same counter to set an input control parameter for each type of message in N types of messages respectively, wherein N is a positive integer more than or equal to 2, each input control parameter is a positive integer, and N input control parameters set for the N types of messages are different from one another;

Step 104: acquiring N count values from the counter when a first preset moment is reached, wherein the N count values include: a total number count of the N types of messages and N-1 input control parameter counts, which are received by a preset port at the first preset moment, each input control parameter count is linearly related to the input control parameters of N-1 types of messages selected from the N types of messages, and the N-1 types of the messages corresponding to different input control parameter counts are partially the same; and Step 106: collecting statistics for traffic, at the first preset moment, of the each type of message in the N types of messages through the N input control parameters and the N count values respectively.

In the related art, the same counter may collect statistics on traffic of only one type of message. According to the method shown in FIG. 1, one and the same counter is adopted to set the input control parameters for each type of message in the N types of messages respectively, N is a positive integer more than or equal to 2, each input control parameter is a positive integer, and N input control parameters are different from one another; the N count values are acquired from the counter when the first preset moment is reached, the N count values include: a total number of the N types of messages and N−1 input control parameter counts, which are received by the preset port at the first preset moment, each input control parameter count is linearly related to the input control parameters of the N−1 types of messages selected from the N types of messages, and the N−1 types of the messages corresponding to different input control parameter counts are partially the same; and statistics are collected for traffic, at the first preset moment, of the each type of message in the N types of messages through the N input control parameters and the N count values respectively. The problem that the same counter may collect statistics on the traffic of only one type of message in the related art is solved, thereby saving counter resources, ensuring accuracy of traffic statistics on multiple types of messages at the same time, and improving flexibility and stability of a network.

As an example embodiment of the present disclosure, it is supposed that the same counter is adopted to simultaneously collect statistics on traffic of an A type of message and traffic of a B type of message at t1. An input control parameter set for the A type of message by the counter is a, and an input control parameter set for the B type of message by the counter is b, wherein a and b are both positive integers, and a is unequal to b. The counter is read at t1 to obtain a total number count count1 and input control parameter count count2 of the A type of message and the B type of message, and then if it is further supposed that the traffic of the A type of message is X and the traffic of the B type of message is Y, the following system of linear equations of two unknowns is obtained:

$$X+Y=\text{count1} \qquad \text{equation 1}$$

$$aX+bY=\text{count2} \qquad \text{equation 2}$$

Since a, b, count1 and count2 are all known, thus X and Y can be calculated as follows:

$$X=(\text{count2}-b\text{count1})/(a-b)$$

$$Y=(a\text{count1}-\text{count2})/(a-b)$$

That is, the same counter may be adopted to obtain the traffic $(\text{count2}-b\text{count1})/(a-b)$ of the A type of message and the traffic $(a\text{count1}-\text{count2})/(a-b)$ of the B type of message at t1.

As another example embodiment of the present disclosure, it is supposed that the same counter is adopted to simultaneously collect statistics on traffic of an A type of message, traffic of a B type of message and traffic of a C type of message at t1, an input control parameter set for the A type of message by the counter is a, an input control parameter set for the B type of message by the counter is b and an input control parameter set for the C type of message by the counter is c, wherein a, b and c are all positive integers, and a, b and c are unequal. The counter is read at t1 to obtain a total number count count1 of the A type of message, the B type of message and the C type of message, an input control parameter count count2 of the A type of message and the B type of message, and an input control parameter count count3 of the B type of message and the C type of message. At this time, if it is further supposed that the traffic of the A type of messages is X, the traffic of the B type of messages is Y and the traffic of the C type of messages is Z, the following system of ternary linear equations is obtained:

$$X+Y=\text{count1} \qquad \text{equation 1}$$

$$aX+bY=\text{count2} \qquad \text{equation 2}$$

$$bY+cZ=\text{count3} \qquad \text{equation 3}$$

Since a, b, c, count1, count2 and count3 are all known, X, Y and Z can be calculated as follows:

$$X=(\text{count2}-b\text{count1})/(a-b)$$

$$Y=(a\text{count1}-\text{count2})/(a-b)$$

$$Z=[\text{count3}-(a+1)\text{count2}-ab\text{count1}]/(ac-bc)$$

That is, the same counter may be adopted to obtain the traffic $(\text{count2}-b\text{count1})/(a-b)$ of the A type of message, the traffic $(a\text{count1}-\text{count2})/(a-b)$ of the B type of message and the traffic $[\text{count3}-(a+1)\text{count2}-ab\text{count1}]/(ac-bc)$ of the C type of message at t1.

It is important to note that the abovementioned example embodiments are only adopted to explain the technical solution recorded in claim 1 and not intended to form limits to the present disclosure, and if the same counter is adopted to collect statistics on traffic of N types of messages, the system of linear equations with N unknowns may be established for solution.

In an example embodiment, before Step 102 of adopting the same counter to set the input control parameters for the each type of message respectively, the method may further include the following operations:

Step 1: extracting forwarding information of the each type of message in M types of messages respectively, wherein M is a positive integer, and M is more than or equal to N; and Step 2: determining the N types of messages in the M types of messages according to the forwarding information.

In the example embodiment, if the M types of messages are received at the preset port, firstly, the forwarding information of the each type of message may be acquired from the type of messages, and then it is determined whether statistics on traffic of the type of message are required to be collected through a preset flag bit in the forwarding information; the type of message may be directly forwarded if the statistics on traffic of the type of message are not required to be collected through the preset flag bit in the forwarding information, and the statistics may be collected on the traffic of the type of message at a preset moment by adopting the abovementioned statistics collection method if the statistics on traffic of the type of message are required to be collected through the preset flag bit in the forwarding information.

In an example embodiment, Step 1 of extracting the forwarding information of the each type of message in the M types of messages respectively may include the following steps:

Step 11: acquiring characteristic information of the each type of message in the M types of messages respectively, and analyzing the characteristic information; and Step 12: extracting the forwarding information from the analyzed characteristic information.

In the example embodiment, the characteristic information of the messages may include, but not limited to, at least one of:

(1) information of a port that the messages enter;

(2) Virtual Local Area Network (VLAN) information carried in the messages, wherein the VLAN information may include: a single-layer tag and a double-layer tag;

(3) VLAN priority information;

(4) forwarding tag information;

(5) source Media Access Control (MAC) addresses and destination MAC addresses of the messages;

(6) source Internet Protocol (IP) addresses and destination IP addresses of the messages; and (7) a port number of Transmission Control Protocol (TCP).

The extraction of the forwarding information may be implemented by the following two operating steps:

The first step: analyzing the characteristic information in the received messages, wherein the analyzed characteristic information may include all contents of the abovementioned items, whereas not all the information is required to be extracted every time, but the information to be extracted is selected in combination with a message forwarding flow which is currently executed; and The second step: preparing to put the messages into the corresponding forwarding flows, wherein the forwarding information is required to be extracted from the abovementioned characteristic information to determine whether it is required to collect statistics on traffic of this type of message.

In an example embodiment, after Step 2 of determining the N types of messages in the M types of messages according to the forwarding information, the method may further include the following steps:

Step 3: dividing the counter into N bit fields according to the total number of the N types of messages and the N input control parameters, wherein each bit field in the N bit fields is in one-to-one correspondence with a total number count of the N types of messages and each count in the N−1 input control parameter counts respectively.

In the example embodiment, if the same counter is adopted to simultaneously collect statistics on the traffic of the N types of messages, the counter may be divided into the N bit fields, wherein one bit field corresponds to the total number count of the N types of messages, and the other N−1 bit fields may be in one-to-one correspondence with each count in the N−1 input control parameter counts.

In an example embodiment, after Step 2 of determining the N types of messages in the M types of messages according to the forwarding information, the method may further include the following operations:

Step 4: acquiring N count values again from the counter when a second preset moment is reached;

Step 5: collecting statistics again for traffic, at the second preset moment, of the each type of message in the N types of messages respectively through the N count values acquired at the second preset moment and the N input control parameters; and Step 6: calculating traffic of the each type of message in the N types of messages in a preset time period by adopting the traffic, at the first preset moment, of the each type of message in the N types of messages and the traffic, at the second preset moment, of the each type of message in the N types of messages, wherein the preset time period is a time period from the first preset moment to the second preset moment.

In the example embodiment, if it is required to obtain statistical traffic comparison of all the types of messages in the preset time period (for example: from t1 to t2), all the counts in the N bit fields in the counter may be read at t1, and then the traffic of the each type of message at t1 may be determined through the manner of collecting statistics according to the input control parameters set for each type of message by the counter; and similarly, the traffic of the each type of message at t2 may be determined through the manner of collecting statistics in the same way. Finally, subtraction operation is executed between the traffic of the each type of message at t2 and the traffic of the each type of message at t1, thereby obtaining the traffic of the type of message in the preset time period to implement comparison among the traffic of different types of messages in the preset time period. Thus it can be seen that the comparison among the traffic of different types of messages in the preset time period may be implemented by a simple operation, and the comparison is implemented in the same counter, so that accuracy of traffic statistics is ensured.

In an example embodiment, after Step 106 of collecting statistics on the traffic of the each type of message in the N types of messages at the first preset moment through the N input control parameters and the N count values respectively, the method may further include the following processing step:

Step 7: forwarding the each type of message according to characteristic information of the each type of message in the N types of messages respectively.

In the example embodiment, if statistics on the traffic of the N types of messages have been finished, the each type of message may be put into the corresponding forwarding flows respectively. At this time, one or more items may be extracted from the abovementioned characteristic information as indexes of a logic port table, for example: for a layer-2 forwarded message, information of a port that the message enters and VLAN information carried by the message are required to be acquired; for a layer-3 forwarded message, a destination IP address of the message is required to be acquired; and for a tag-forwarded message, tag information in the message is required to be acquired.

An example implementation process is further described below with reference to an example implementation manner shown in FIG. 2.

Figure 2:
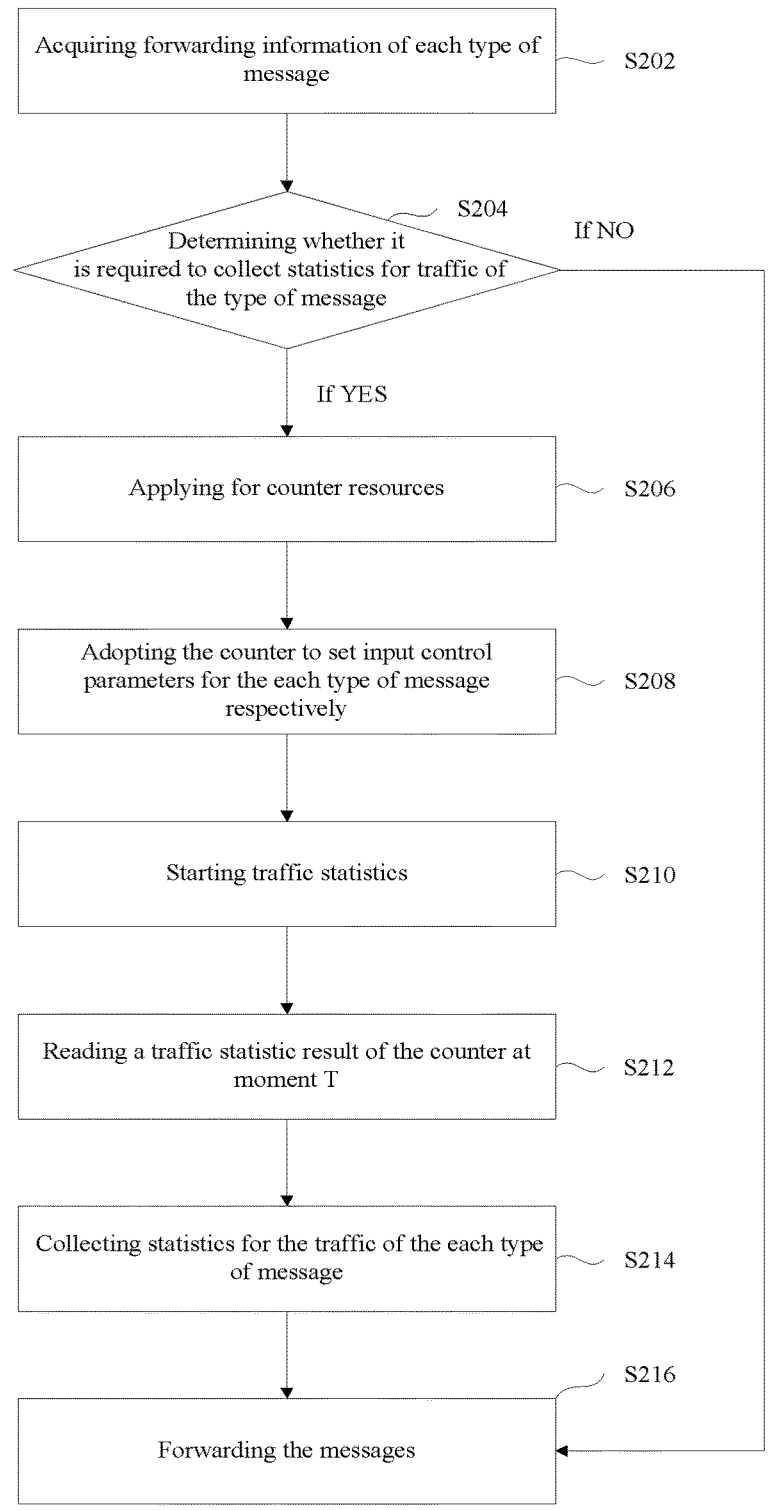
FIG. 2 is a flowchart of a traffic statistics collection method according to an example embodiment of the present disclosure.

FIG. 2 is a flowchart of a traffic statistics collection method according to an example embodiment of the present disclosure. As shown in FIG. 2, the method may include the following processing steps:

Step 202: acquiring characteristic information of each type of message according to multiple types of messages received by a preset port respectively, and then extracting forwarding information of the type of message from the acquired characteristic information.

In the example embodiment, the types of the messages are not specifically distinguished in the traffic statistics collection method, that is, the messages may be data messages, for example, ordinary layer-2 and layer-3 messages, may also be Multi-Protocol Label Switching (MPLS) messages and Pseudo-Wire Emulation Edge to Edge (PWE3) messages, and may further be detection messages, for example: Operation Administration and Maintenance (OAM) messages, Bidirectional Forwarding Detection (BFD) messages and Connectivity Fault Management (CFM) messages.

Step 204: determining whether it is required to collect statistics for traffic of the type of message according to the forwarding information of the each type of message, continuing executing Step 206 and executing a traffic statistics collection operation if it is required to collect statistics on the traffic of the type of message according to the forwarding information of the each type of message, otherwise turning to Step 216.

Step 206: applying for and managing corresponding counter resources, wherein the counter resources may include: a memory capacity (which is required to be determined according to the types of the messages) of a counter and identification information of the counter.

Step 208: adopting the counter to set input control parameters for the each type of message, wherein what is input is not practical length of the type of message but one configurable parameter values; one parameter value may be adopted for statistics on the traffic of only one type of message, the input control parameters of all types of messages are positive integers, and the input control parameters for collecting statistics on the traffic of the each type of message are different from one another.

Step 210: starting achieving to collect statistics on the traffic of multiple different types of messages by using the same counter.

Step 212: reading a traffic statistics collection result of the counter at moment T, wherein the traffic statistics collection result may include: a total number count of the each type of message and multiple input control parameter counts.

Step 214: through setting different input control parameters for different types of messages by the same counter, obtaining the total message number count and multiple input control parameter counts of the multiple types of messages on which statistics are required to be simultaneously collected, and then establishing a system of linear equations with multiple unknowns, the traffic of each type of message on which statistics are required to be simultaneously collected at moment T being obtained.

Step 216: forwarding the each type of message to corresponding destinations according to forwarding path information in the characteristic information of each type of message.

Thus it can be seen that statistics on the traffic of the each type of message are successfully finished on the premise of ensuring normal forwarding of the each type of message in the example embodiment, and a requirement on implementation of a specific network function and diagnosis method in case of counter resource shortage and simultaneous reading of multiple different traffic statistics is met, for example: it is often required to collect statistics on data packets received and sent within a certain time period during OAM diagnosis, and the statistics collection method provided in the example embodiment may effectively avoid a reading time error and ensure traffic statistics collection accuracy. The same counter resource is adopted to implement traffic statistics on multiple different types of messages, so that counter resources are saved. In addition, determination in traffic statistics may further get down to each data stream, so that the flexibility and stability of the network are improved.

Figure 3:
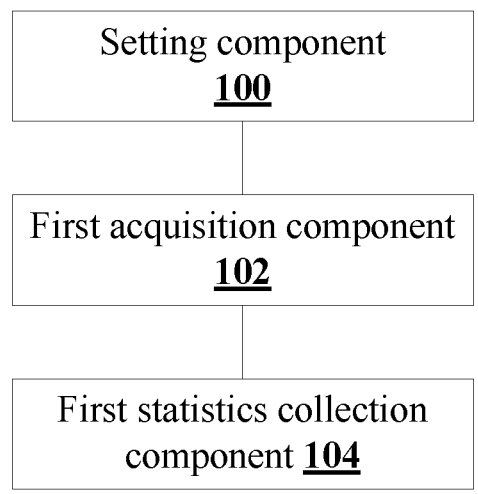
FIG. 3 is a structure diagram of a traffic statistics collection device according to an embodiment of the present disclosure.

FIG. 3 is a structure diagram of a traffic statistics collection device according to an embodiment of the present disclosure. As shown in FIG. 3, the traffic statistics collection device may include: a setting component 100, configured to adopt one and the same counter to set input control parameters for each type of message in N types of messages respectively, wherein N is a positive integer more than or equal to 2, each input control parameter is a positive integer, and N input control parameters are different from one another; a first acquisition component 102, configured to acquire N count values from the counter when a first preset moment is reached, wherein the N counter values include: a total number count of the N types of messages and N−1 input control parameter counts, which are received by a preset port at the first preset moment, each input control parameter count is linearly related to the input control parameters of N−1 types of messages selected from the N types of messages, and the N−1 types of the messages corresponding to different input control parameter counts are partially the same; and a first statistics collection component 104, configured to collect statistics for traffic, at the first preset moment, of the each type of message in the N types of messages through the N input control parameters and the N count values respectively.

By the device shown in FIG. 3, the problem that the same counter may collect statistics on the traffic of only one type of message in the related art is solved, thereby saving counter resources, ensuring accuracy of traffic statistics on multiple types of messages at the same time, and improving flexibility and stability of a network.

Figure 4:
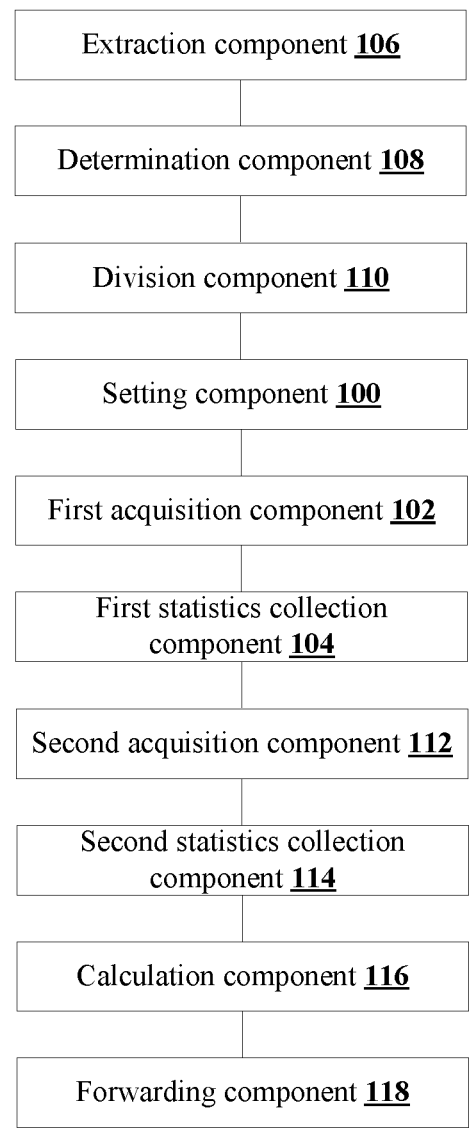
FIG. 4 is a structure diagram of a traffic statistics collection device according to an example embodiment of the present disclosure.

In an example embodiment, as shown in FIG. 4, the device may further include: an extraction component 106, configured to extract forwarding information of the each type of message in M types of messages respectively, wherein M is a positive integer, and M is more than or equal to N; and a determination component 108, configured to determine the N types of messages in the M types of messages according to the forwarding information.

In an example embodiment, the extraction component 106 may include: an acquisition element (not shown in the drawings), configured to acquire characteristic information of the each type of message in the M types of messages respectively, and analyze the characteristic information; and an extraction element (not shown in the drawings), configured to extract the forwarding information from the analyzed characteristic information.

In an example embodiment, as shown in FIG. 4, the device may further include: a division component 110, configured to divide the counter into N bit fields according to the total number of the N types of messages and the N input control parameters, wherein each bit field in the N bit fields is in one-to-one correspondence with a total number count of the N types of messages and each count in the N−1 input control parameter counts respectively.

In an example embodiment, as shown in FIG. 4, the device may further include: a second acquisition component 112, configured to acquire N count values again from the counter when a second preset moment is reached; a second statistics collection component 114, configured to collect statistics again for traffic, at the second preset moment, of the each type of message in the N types of messages respectively through the N count values acquired at the second preset moment and the N input control parameters; and a calculation component 116, configured to calculate traffic of the each type of message in the N types of messages in a preset time period by adopting the traffic, at the first preset moment, of the each type of message in the N types of messages and the traffic, at the second preset moment, of the each type of message in the N types of messages, wherein the preset time period is a time period from the first preset moment to the second preset moment.

In an example embodiment, as shown in FIG. 4, the device may further include: a forwarding component 118, configured to forward the each type of message according to characteristic information of the each type of message in the N types of messages respectively.

From the above, it can be seen that the embodiment achieves the following technical effects (it is important to note that these effects are effects achievable for some example embodiments): according to the technical solutions provided by the present disclosure, the characteristic information of each type of message is acquired from multiple types of received messages, and then the forwarding information corresponding to the each type of message is extracted from the characteristic information. If statistics on the traffic of the type of message are required, the corresponding counter resource is applied for, input control parameter setting of the same counter is controlled to obtain the total number count and input control parameter counts of the multiple types of messages which are required to be simultaneously counted. Traffic statistics for each type of message may be finished at the same time by a simple operation, and a requirement on implementation of a specific network function and diagnosis method in case of counter resource shortage and simultaneous reading of multiple different traffic statistics is met, so that counter resources are saved; and in addition, determination in traffic statistics may further get down to each data stream, so that the flexibility and stability of the network are improved.

Obviously, those skilled in the art shall understand that the above-mentioned components or steps of the present disclosure can be realized by using general purpose calculating device, can be integrated in one calculating device or distributed on a network which consists of a plurality of calculating devices. Alternatively, the components or the steps of the present disclosure can be realized by using the executable program code of the calculating device. Consequently, they can be stored in the storing device and executed by the calculating device, or they are collected into integrated circuit component respectively, and the shown or described steps may be executed in a sequence different from the sequence described here under a certain condition, or a plurality of components or steps thereof are collected into one integrated circuit component. In this way, the present disclosure is not restricted to any particular hardware and software combination.

The descriptions above are only the example embodiment of the present disclosure, which are not used to restrict the present disclosure. For those skilled in the art, the present disclosure may have various changes and variations. Any amendments, equivalent substitutions, improvements, etc. within the principle of the present disclosure are all included in the scope of the protection of the present disclosure.

INDUSTRIAL APPLICABILITY

From the above, the traffic statistics collection method and device provided by the embodiment of the present disclosure have the following beneficial effects: a requirement on implementation of a specific network function and diagnosis method in case of counter resource shortage and simultaneous reading of multiple different traffic statistics is met, so that counter resources are saved; and in addition, determination in traffic statistics may further get down to each data stream, so that the flexibility and stability of a network are improved.

What is claimed is:

1. A traffic statistics collection method, comprising:
   adopting one and the same counter to set an input control parameter for each type of message in N types of messages respectively, wherein N is a positive integer more than or equal to 2, each input control parameter is a positive integer, and N input control parameters set for the N types of messages are different from one another;
   acquiring N count values from the counter when a first preset moment is reached, wherein the N count values comprise: a total number count of the N types of messages and N−1 input control parameter counts, which are received by a preset port at the first preset moment, each input control parameter count is linearly related to the input control parameters of N−1 types of messages selected from the N types of messages, and the N−1 types of the messages corresponding to different input control parameter counts are partially the same; and
   collecting statistics for traffic, at the first preset moment, of the each type of message in the N types of messages through the N input control parameters and the N count values respectively;
   wherein before adopting the same counter to set the input control parameters for the each type of message respectively, the method further comprises: extracting forwarding information of the each type of message in M types of messages respectively, wherein M is a positive integer more than or equal to N; and determining the N types of messages in the M types of messages according to the forwarding information; wherein after collecting statistics for the traffic, at the first preset moment, of the each type of message in the N types of messages through the N input control parameters and the N count values respectively, the method further comprises:forwarding the each type of message according to characteristic information of the each type of message in the N types of messages respectively.

2. The method according to claim 1, wherein extracting the forwarding information of the each type of message in the M types of messages respectively comprises:
   acquiring characteristic information of the each type of message in the M types of messages respectively, and analyzing the characteristic information; and
   extracting the forwarding information from the analyzed characteristic information.

3. The method according to claim 1, wherein after determining the N types of messages in the M types of messages according to the forwarding information, the method further comprises:
   dividing the counter into N bit fields according to the total number of the N types of messages and the N input control parameters, wherein each bit field in the N bit fields is in one-to-one correspondence with a total number count of the N types of messages and each count in the N−1 input control parameter counts respectively.

4. The method according to claim 1, wherein after determining the N types of messages in the M types of messages according to the forwarding information, the method further comprises:
   acquiring N count values again from the counter when a second preset moment is reached;
   collecting statistics again for traffic, at the second preset moment, of the each type of message in the N types of messages respectively through the N count values acquired at the second preset moment and the N input control parameters; and
   calculating traffic of the each type of message in the N types of messages in a preset time period by adopting the traffic, at the first preset moment, of the each type of message in the N types of messages and the traffic, at the second preset moment, of the each type of message in the N types of messages, wherein the preset time period is a time period from the first preset moment to the second preset moment.

5. A traffic statistics collection device, comprising:
a setting component, configured to adopt one and the same counter to set an input control parameter for each type of message in N types of messages respectively, wherein N is a positive integer more than or equal to 2, each input control parameter is a positive integer, and N input control parameters set for the N types of messages are different from one another;
a first acquisition component, configured to acquire N count values from the counter when a first preset moment is reached, wherein the N count values comprise: a total number count of the N types of messages and N−1 input control parameter counts, which are received by a preset port at the first preset moment, each input control parameter count is linearly related to the input control parameters of N−1 types of messages selected from the N types of messages, and the N−1 types of the messages corresponding to different input control parameter counts are partially the same; and
a first statistics collection component, configured to collect statistics for traffic, at the first preset moment, of the each type of message in the N types of messages through the N input control parameters and the N count values respectively;
wherein the device further comprise: an extraction component, configured to extract forwarding information of the each type of message in M types of messages respectively, wherein M is a positive integer more than or equal to N; and a determination component, configured to determine the N types of messages in the M types of messages according to the forwarding information; a forwarding component, configured to forward the each type of message according to characteristic information of the each type of message in the N types of messages respectively.

6. The device according to claim 5, wherein the extraction component comprises:
an acquisition element, configured to acquire characteristic information of the each type of message in the M types of messages respectively, and analyze the characteristic information; and
an extraction element, configured to extract the forwarding information from the analyzed characteristic information.

7. The device according to claim 5, further comprising:
a division component, configured to divide the counter into N bit fields according to the total number of the N types of messages and the N input control parameters, wherein each bit field in the N bit fields is in one-to-one correspondence with a total number count of the N types of messages and each count in the N−1 input control parameter counts respectively.

8. The device according to claim 5, further comprising:
a second acquisition component, configured to acquire N count values again from the counter when a second preset moment is reached;
a second statistics collection component, configured to collect statistics again for traffic, at the second preset moment, of the each type of message in the N types of messages respectively through the N count values acquired at the second preset moment and the N input control parameters; and
a calculation component, configured to calculate traffic of the each type of message in the N types of messages in a preset time period by adopting the traffic, at the first preset moment, of the each type of message in the N types of messages and the traffic, at the second preset moment, of the each type of message in the N types of messages, wherein the preset time period is a time period from the first preset moment to the second preset moment.

* * * * *